United States Patent [19]

Marrs et al.

[11] Patent Number: 5,633,030
[45] Date of Patent: May 27, 1997

[54] XANTHAN GELLING AGENTS

[75] Inventors: William M. Marrs, Horsham; Iain C. Mutter Dea, Guilford, both of United Kingdom

[73] Assignee: CPC International Inc., Englewood Cliffs, N.J.

[21] Appl. No.: 457,368

[22] Filed: Jun. 1, 1995

Related U.S. Application Data

[63] Continuation of Ser. No. 169,692, Dec. 17, 1993.

[30] Foreign Application Priority Data

Dec. 18, 1992 [GB] United Kingdom ............ 9226391

[51] Int. Cl.$^6$ ............................ A23L 1/0526; A23L 1/054
[52] U.S. Cl. ............................ 426/573; 426/658
[58] Field of Search ............................ 426/573, 575, 426/576, 577, 578, 579, 658

[56] References Cited

U.S. PATENT DOCUMENTS

| | | | |
|---|---|---|---|
| 4,081,566 | 3/1978 | Haber | 426/578 |
| 4,200,661 | 4/1980 | Brigand et al. | 426/573 |
| 4,219,582 | 8/1980 | Cheng | 426/578 |
| 4,479,973 | 10/1984 | Holley | 426/573 |
| 4,746,528 | 5/1988 | Prest et al. | 426/573 |
| 4,826,700 | 5/1989 | Bayerlein | 426/573 |
| 5,153,317 | 10/1992 | Ortega et al. | 8/543 |

FOREIGN PATENT DOCUMENTS

| | | | |
|---|---|---|---|
| 0121960 | 10/1984 | European Pat. Off. | C12P 19/14 |
| 0242056 | 10/1987 | European Pat. Off. | A23G 9/02 |
| 2357188 | 2/1978 | France | A23L 1/04 |
| 1565006 | 4/1980 | United Kingdom | A23L 1/04 |

OTHER PUBLICATIONS

Japanese Patent Application No. 2-299557, published Dec. 11, 1990 with Abstract.

V. J. Morris, Science, structure and applications of microbial polysaccharides AFRC Institute of Food Research, Norwich Laboratory, Gums and Stabilisers For The Food Industry 5, IRL Press at Oxford University Press, New York, 1990, pp. 315–320.

Patent Abstracts of Japan, vol. 004, No. 155 (C–029)29 Oct. 1980 & JP-A-55 102 360 (Ono Fujio) 5 Aug. 1980.

P. Kovacs, "Xanthan Gum Galactomannan System Improves Functionality of Cheese Spreads", Chemical Abstracts, vol. 86, No. 5, 1977, p. 263, Columbus, Ohio, Abstract No. 28557m and Food Prod. Dev. vol. 46, No. 8, 1976, pp. 32–38.

EPO Standard Search Report dated 15 Jul. 1993, File RS 91603 GB.

*Primary Examiner*—Jeanette Hunter
*Attorney, Agent, or Firm*—Brooks Haidt Haffner & Delahunty

[57] ABSTRACT

Gelling agent compositions are provided that comprise xanthan and at least one polysaccharide selected from guar, depolymerized galactomannan and mixtures thereof. The compositions may be used in comestible products and methods of making same and gelled products are also provided.

15 Claims, 3 Drawing Sheets

XANTHAN GELLING AGENTS

BACKGROUND OF THE INVENTION

This application is a continuation, of application Ser. No. 08/169,692, filed Dec. 17, 1993.

1. Field of Invention

This invention relates to gelling agents which are used in foods for a variety of purposes. As well as in familiar gelled foods, such as table jellies and similar desserts, confectionery jellies and jams, gelling agents are also valuable in meat products, and in the stabilization of emulsions in, for example, salad dressings.

2. Description of Related Art

There are two major types of food gel: those which set reversibly on cooling, and those which set irreversibly on heating. The former rely mainly on polysaccharide gelling agents, such as carrageenan, while the latter typically involve proteins, such as egg-white. Gelatin is an unusual gelling agent in that, although it consists of a mixture of proteins, its behavior is more typical of that of polysaccharides. Thus, gelatin solutions set to gels on cooling and these can be re-melted on heating.

This invention is concerned with gels which set reversibly on cooling.

A range of gelling agents is available to the food-manufacturing industry, and the selection of a suitable gelling agent for a particular application depends on many factors. Gelling agents differ in price, availability and usage rate, and also in the conditions under which they can be used and, therefore, the types of food in which they may be suitable. For example, native citrus pectin (with a high methyl ester content) forms a clear gel in the presence of acid and high concentrations of sugar, and is therefore exploited in jams and fruit jellies. Low methoxy pectin can be made to gel in the presence of calcium ions and does not require the presence of sugar; it is therefore suitable for use in reduced calories products.

Despite this variety of gelling agents, gelatin remains unique because of its melting behavior. Gelatin gels melt at around 30°–35° C., which is below body temperature (37° C.). Thus gelatin gels melt in the mouth, and this property has implications for improved flavor release as well as texture. The approximate melting properties of some polysaccharide-type gels are shown below.

| Melting Properties of Polysaccharide-Type Gels | |
| --- | --- |
| Gelling Agent | Melting Temperature (°C.) |
| Cornstarch | 95 |
| Kappa-carrageenan | 65 |
| Alginate | 100 |
| Low Methoxy Pectin | 65 |
| Gelatin | 30–35 |

Another unusual feature of gelatin is that it is derived from animal sources (usually bones or hides), rather than from plants or seaweed or by bacterial fermentation. For food use, this is unacceptable to vegetarians. Furthermore, certain ethnic and religious groups cannot consume pork or pig products and may avoid any gelatin-containing food where the source of the gelatin is not specified as non-porcine. Gelatin is also an expensive product and forms gels only at relatively high concentrations. There is, thus, a need for a gelling agent which has the gelling properties of gelatin, which is capable of producing gels having melting properties similar to those of gelatin gels but which is derived from a non-mammalian source and which is capable of forming gels at low usage levels.

Xanthan is a high molecular weight polysaccharide produced by fermentation of the bacterium *Xanthomonas campestris*. Its high viscosity in aqueous solution is exploited by the food industry, particularly in the stabilization of emulsions, and in the oil industry in the production of drilling muds. Although xanthan solutions have a yield stress at zero shear rate, they will flow as viscous liquids if this stress is exceeded; thus, they do not form true gels. Xanthan has a cellulosic backbone, comprised of β-1,4-linked glucose residues. To alternate glucose units is attached a trisaccharide side chain containing a mannose, a glucuronic acid, and a second mannose residue. The first mannose is acetylated, while approximately half of the terminal mannose residues of the side chains contain a pyruvate substituent. The pyruvate content of food-grade xanthan forms a part of its legal definition in the USA and the EC.

Locust Bean Gum, (LBG; also known as Carob, or Carob Gum) is a polysaccharide derived from the endosperm of the Locust Bean (*Ceratonia siliqua*), which grows in Mediterranean regions. It is employed by the food industry as a thickener/stabilizer, for example in ice cream, but it too does not form gels on its own. LBG is a galactomannan, having a backbone consisting of β-1,4-linked mannose residues with single α-1,6-linked galactose side units.

LBG does, however, interact with some other polysaccharides to give valuable synergistic effects. Thus, the seaweed polysaccharides, kappa-carrageenan and agar, which are exploited as gelling agents by the food industry, form stronger gels if mixed with LBG. Replacement of 50% of the carrageenan with LBG gives a stronger gel with a more elastic texture, and, depending on the relative prices of kappa-carrageenan and LBG at any given time, may give significant cost savings.

LBG also interacts with xanthan. In this case, although neither of the polysaccharides gels on its own, the mixture of the two forms a strong, rubbery gel. Again, the fact of gelation when mixed with LBG forms a part of the legal definition of food-grade xanthan in the USA. The interaction, and therefore the gelation of the mixture, is believed to involve unsubstituted (i.e., galactose-free) regions of the LBG galactomannan aligning themselves with the cellulose backbone of the xanthan to create a three-dimensional polysaccharide network (Dae el al, 1972; McCleary, 1979). Xanthan/LBG gels, however, have a melting temperature far in excess of the melting temperature of gelatin gels, and typically in the range of from 50°–60° C. depending on the method by which the xanthan-producing organism, *Xanthomonas campestris*, has been treated to yield the xanthan. Gels produced using the xanthan/LBG system have an unpleasant rubbery and elastic texture.

Other mixtures of polysaccharides are known to form gels in aqueous solution. Examples of such mixtures include blends of alginate with pectin and of konjac mannan with agar, kappa-carrageenan or xanthan. As in the case of xanthan/LBG gels, however, the melting temperature of the resulting gels is significantly higher than that of gelatin gels and they cannot be used to form so-called melt-in-the-mouth gels.

It is generally accepted that guar galactomannan, with a galactose content higher than that of LBG, does not interact sufficiently by association with xanthan polysaccharide to produce gels, although weak interactions between the two polysaccharides do increase the viscosity of xanthan solutions.

SUMMARY OF THE INVENTION

It has surprisingly been found that gels having melt-in-the-mouth characteristics may be produced by using xanthan in combination with galactomannans such as guar gum.

Hence, the by present invention, commercially useful polysaccharide gelling agents are obtained which are capable of producing gels having desirable melt-in-the-mouth properties, including gel strengths and elasticity similar to those of gelatin gels.

Accordingly, the present invention provides a gelling agent composition comprising xanthan and polysaccharide selected from guar, depolymerized galactomannan and mixtures thereof. Preferably, the depolymerized galactomannan is depolymerized guar. Preferably, the composition comprises from 20 to 80% by weight (more preferably 30 to 70% by weight) xanthan. In one embodiment of the invention, the polysaccharide is guar and the composition may further comprise locust bean gum. A preferred composition of this embodiment of the invention comprises from 20 to 80% by weight xanthan, up to 20% by weight locust bean gum (preferably 0.5% to 10% by weight) and from 20 to 80% by weight guar gum (e.g., from 40 to 60% by weight).

In a further embodiment of the invention, the composition comprises xanthan gum and at least one of the depolymerized galactomannans sold under the trade names MeyproGat 90, MeyproGat 60 and MeyproGat 30. Preferably the compositions comprise from 20 to 80% by weight, more preferably 30 to 70% by weight of the depolymerized galactomannan.

This invention also provides a comestible product comprising at least one of the gelling agent compositions of the invention, preferably in an amount of from 0.3 to 1.5% by weight (e.g., 0.4 to 1.2% by weight). The comestible product may exist in a gelled state and, preferably, the gel has a melting point of from 0° to 45° C. (more preferably from 10° to 40° C.). In another aspect, the invention provides a method of making a gelled product comprising dissolving or dispersing the gelling agent compositions of the invention in an aqueous liquid at an elevated temperature and then lowering the temperature of the resulting solution or dispersion to bring about the gelling thereof. The aqueous liquid may comprise an aqueous solution or dispersion containing one or more food components selected from flavorants, sweeteners, fruit juice, dairy products and edible oils and fats.

DETAILED DESCRIPTION OF THE INVENTION

Figure 1:
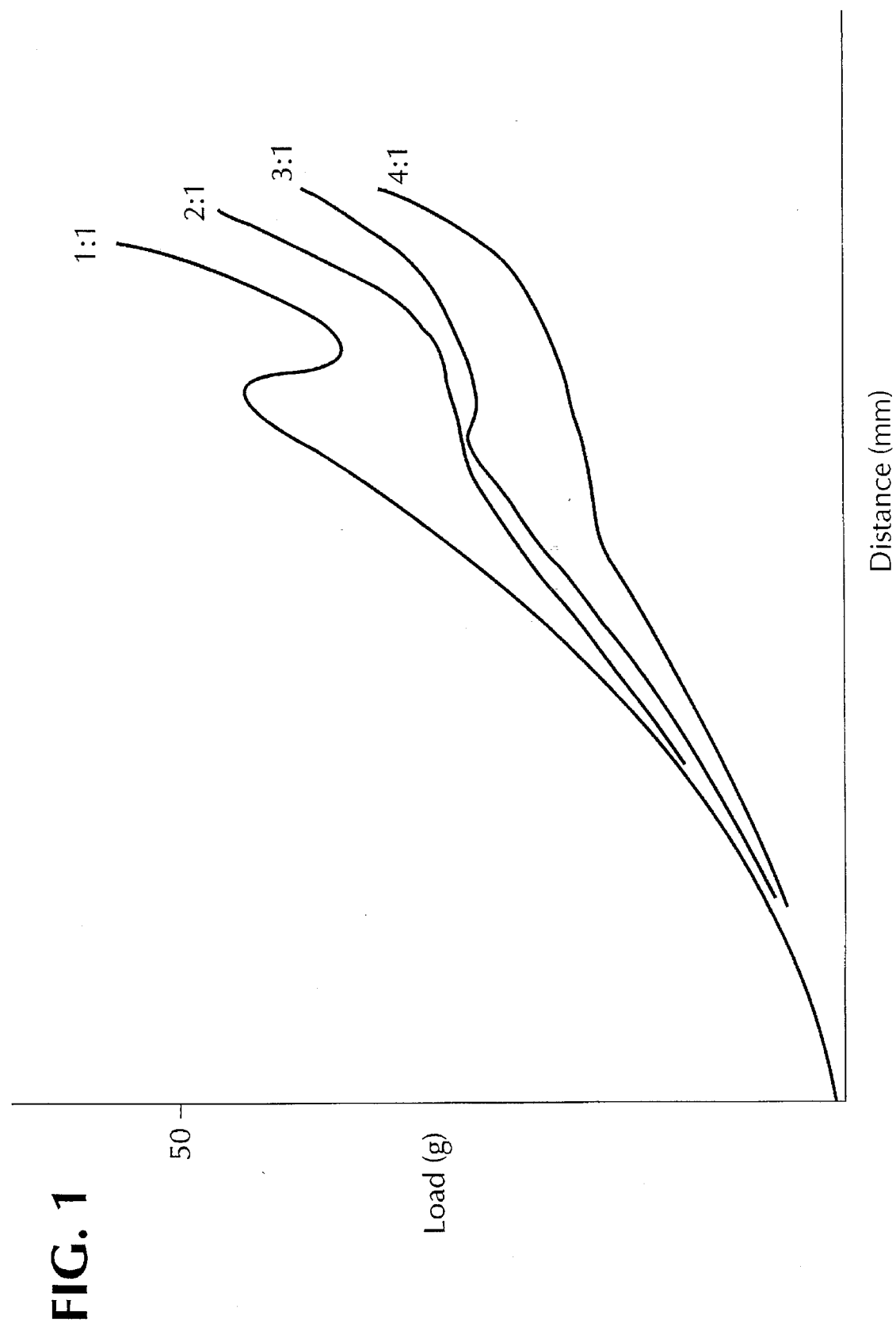

It has previously been generally accepted that guar gum does not form gels with xanthan gum. However, it has now been found that xanthan does interact with guar to form a gel in an aqueous liquid (e.g., water) and that the resulting gels exhibit melt-in-the-mouth properties. The finding that xanthan may interact with guar is believed to be due to some form of change in the method of xanthan production by some suppliers which may have resulted in a change in the properties of the product. Thus, xanthan from different sources may provide different results. Although the gel formed by xanthan/guar mixtures may be weak and may have a low melting point, the inclusion of locust bean gum in the compositions has been found to increase the melting point, break load and rigidity of the gel. It is, therefore, possible to vary the relative amounts of xanthan, guar and, optionally, locust bean gum in the composition to produce a composition capable of forming a gel having the desired properties.

Xanthan has also been found to form gels in aqueous liquids (e.g., water) with depolymerized galactomannans with the resulting gels exhibiting melt-in-the-mouth properties. Suitable depolymerized galactomannans for use with xanthan in such gel-formimg compositions include those sold under the trade names MeyproGat 90, MeyproGat 60 and MeyproGat 30. Preferably the compositions comprise from 20 to 80% (e.g., 30 to 70%) by weight xanthan and from 20 to 80% (e.g., 30 to 70%) by weight depolymerized galactomannan. The resulting gels may have melting points in the range of from 22° to 30° C. and may in some cases with lower molecular weight galactomannan have elastic limits in the range of from 10 to 20 mm (e.g., 13 to 19 mm) which is preferred for certain applications such as in some comestible products.

The term depolymerized as used herein refers to material having a reduced molecular weight relative to the natural substance. Depolymerized material may be obtained by the breaking of bonds in the polysaccharide main chain to produce a range of shorter chains which are substantially chemically identical with the native material other than in molecular weight. The depolymerized material may have a single broad distribution of molecular weights. Depolymerization may be effected in a number of ways such as by means of a chemical treatment or a physical treatment or by a mixture of such treatments to bring about cleavage of the polymer and may take place through a random or a chain process.

The physical properties and, therefore, the mouth-feel of the gelled products may be altered by varying the relative amounts of the component polysaccharides in the compositions and their nature as described above. The physical properties of the gels may also be altered by increasing the concentration of the composition of the invention in the gelled product. Thus, in the case of xanthan/degraded galactomannan compositions, the melting point of the gel may be increased by increasing the total polysaccharide concentration in the gel with, surprisingly, a small decrease in the elastic limit of the gel.

The invention will now be described with reference to the following illustrative examples, which are not intended to be limiting.

EXAMPLES

Materials

Locust bean gum (LBG) was obtained from PFW (UK) Ltd. as the product sold under the trade mark HERCOGUM N1.

Samples of food-grade xanthan were obtained from the following manufacturers:

1. Keltrol from Kelco International Limited, Westminster Tower, 3 Albert Embankment, London SE1 7RZ.

2. Satiaxane CX91 from Sanofi Bioindustries, Sanofi House, Kelvin Road, Newbury, Berks RG13 2DB.

3. Normal A Grade 90551 from Jungbunzlauer Gesellschaft M.B.H., Scharzenbergplatz, P.O. Box 546, A-1011 Vienna, Austria.

4. Rhodigel from Rhone-Poulenc, Secteur Specialties Chimiques Specialities de Formulation, Cedex No. 29F, 92097, Paris-La Defense, France.

Guar gum was obtained from Sigma (G-4129).

MeyproGuar CSSA M-225 and MeyproGat 90, 60 and 30 were obtained from Meyhall Chemical AG, CH-8280 Kreuzlingen, Sonnenwiesenstrasse, P.O. Box 862, Switzerland.

MeyproGuar CSAA M-225, MeyproGat 90, MeyproGat 60 and MeyproGat 30 are very linear, typical guar gum products differing only in their chain length, and therefore, their viscosity per unit concentration. The galactose to mannose ratios for the four products are as follows:

| MeyproGuar CSSA M-225 | 1:about 1.6* |
|---|---|
| MeyproGat 90 | 1:about 1.6* |
| MeyproGat 60 | 1:about 1.7* |
| MeyproGat 30 | 1:about 1.7* |

(* +/− 0.2)

Gel properties

Gel properties were measured using a Stevens LFRA Texture Analyzer fitted with a large hemispherical probe (12.5 mm diameter and 35 mm in length) programmed to penetrate 35 mm into the gel at 0.5 mm/sec. Load/penetration curves were produced on the chart recorder and used to find Break Load, Elastic Limit and Rigidity (Break Load/Elastic Limit).

Melting-point determinations

Falling-drop method: This method is based upon the British Standard (BS 757:1975) procedure for the determination of the melting point of gelatin. After the hot xanthan and polysaccharide solutions had been mixed, 5 ml samples of gel were formed at 10° C. for 18 hours in a test tube positioned at an angle of 45° in a purpose-built test-tube rack. The test tubes were then rotated so that the gel surfaces became vertical and a 200 microlitre aliquot of red dye (Oil Red 0 in carbon tetrachloride) was placed at the angle between the gel and the tube. The test tube rack containing the gel tubes was placed in a glass-fronted water bath at 13°–15° C. and the gel samples heated at approximately 1° C./min. The melting point of the gels was taken to be the temperature at which the drop of red dye fell through the sample to the bottom of the tube. For gels prepared at 1% total concentration, the fall of the drop was impeded by the high viscosity of the sample. The melting point was taken to be the temperature at which the vertical meniscus became level.

Inverted Vial method: After the hot xanthan and LBG solutions had been mixed, 1 ml samples were placed into 2 ml glass screw cap vials in duplicate. The gels were allowed to set at 10° C. for 18 h. The duplicate vials were then inverted into a test tube containing water at 10° C. A test tube rack containing the gel tubes was placed in a glass fronted water bath at 10° C. and the gel samples heated at approximately 1° C./min. The melting point of the gels was taken to be the temperature at which the gel melted and flowed downwards.

CarriMed Rheometer method: A small volume (4.3 ml) of hot sample was placed on the rheometer plate which had been pre-heated to 60° C., and the cone (6 cm diameter, 4°) was brought into position. A small torque was applied to center the sample between the cone and plate. Samples were then subjected to an oscillating stress input using a frequency of 0.7 Hz and a constant low strain of 0.05. Under these conditions, the gel structure is unperturbed by the stress applied. The following experiments were carried out:

(a) Temperature sweep, 70°–5° C.

(b) Time sweep, at 5° C., for 30 minutes (c) Temperature sweep, 5°–70° C.

The storage modulus G' and loss modulus G" were measured as a function of temperature (cooling and heating) and time. Melting points were determined from the G'/temperature curves being the temperature at which the G'values had fallen to that of the fully melted sample.

Guar/xanthan systems

Guar/xanthan mixtures were prepared using different xanthans at various ratios. The mixtures were matured at 4° C. The xanthan from Jungbunzlauer was not available at the time these experiments were performed and was not therefore included. The gel properties of 1% guar/xanthan (Kelco) gels at two compositions are shown in Table 1 whilst the melting points of gels produced with Kelco, Rhone-Poulenc and Sanofi xanthans at four compositions are shown in Table 2.

TABLE 1

Gel properties of 1% guar/xanthan (Keltrol) set at 4° C.

| Composition (guar:xanthan) | Break Load (g) | Elastic Limit (mm) | Gel Rigidity (g/mm) |
|---|---|---|---|
| 1:1 | 44.6 | 25.9 | 1.7 |
| 3:1 | 27.8 | 23.9 | 1.2 |

TABLE 2

Melting points of 1% guar/xanthan set at 4° C.

| Composition (guar:xanthan) | Kelco | Phone-Poulenc | Sanofi |
|---|---|---|---|
| 4:1 | 24–26 | 20–22 | 20–22 |
| 3:1 | 30–33 | 22–24 | 22–24 |
| 2:1 | 31–34 | 24–27 | 22–24 |
| 1:1 | 30–32 | 20–22 | 21–23 |

Figure 2:
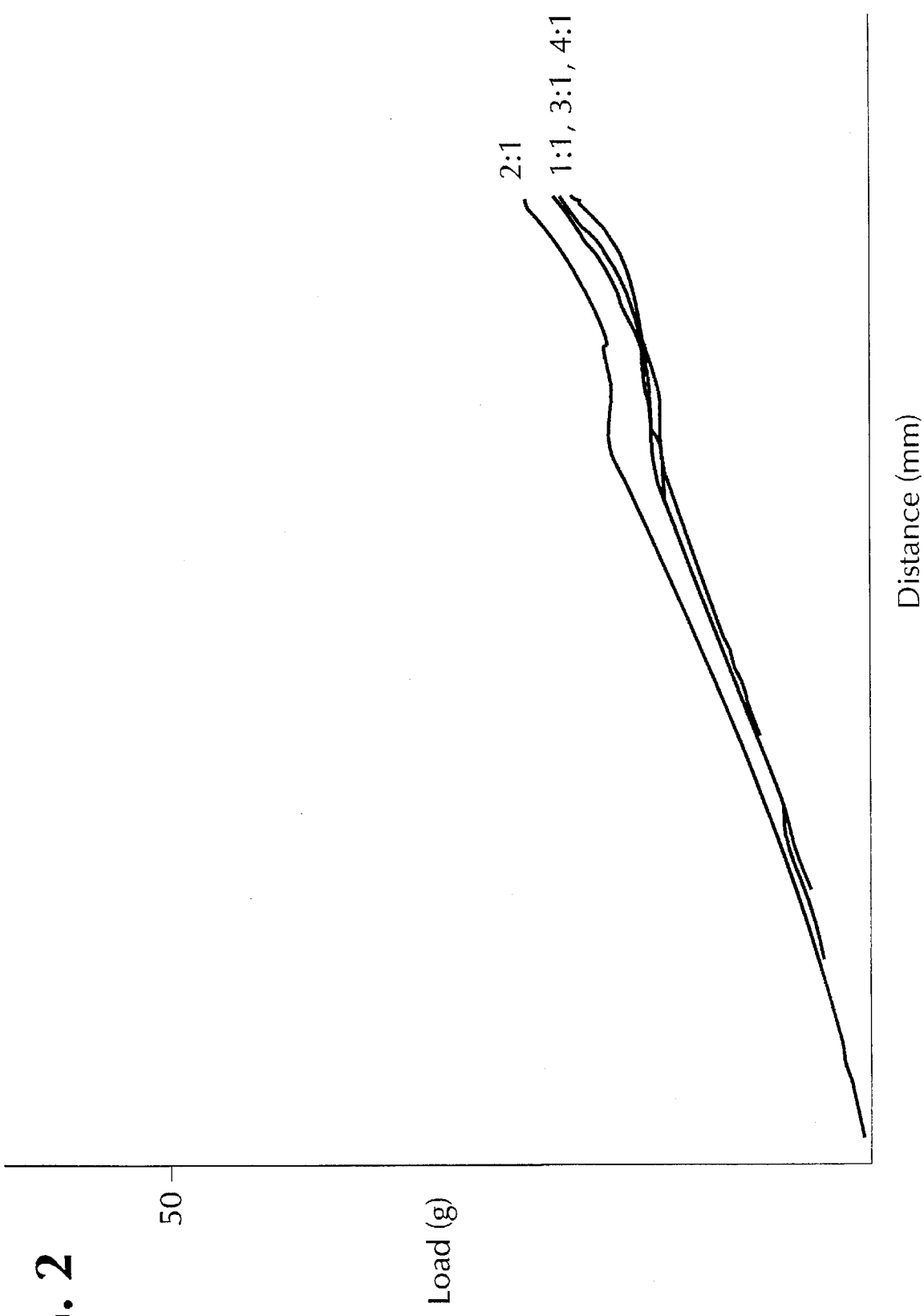
Figure 3:
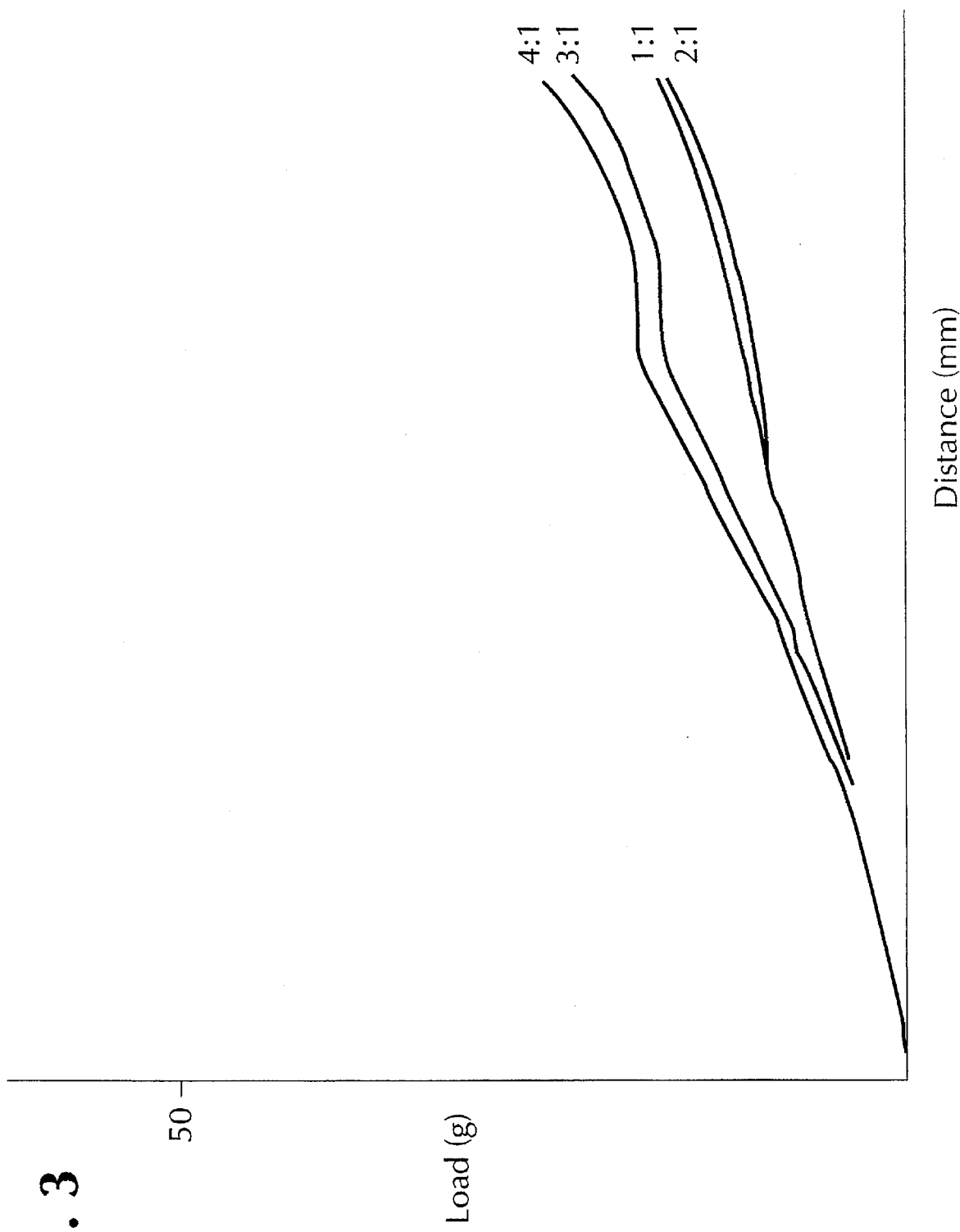

Stevens-LFRA Texture Analyzer load-penetration curves for guar/xanthan gels produced using Kelco xanthan are shown in FIG. 1 whilst the gels produced using Sanofi xanthan and Rhone-Poulenc xanthan are shown in FIGS. 2 and 3. Definite gel structure was evident in the gels made with Kelco xanthan but the other xanthans produced only very weak gels for which data on gel strength and elastic limit could not be reliably obtained.

The Brookfield viscosities of the four xanthans at 23.9° C. and 65.6° are given in Table 3.

TABLE 3

Standard viscosities for commercial xanthans

| Xanthan | Brookfield viscosity (cP) | | Ratio (/b) |
|---|---|---|---|
| | at 23.9° C. (a) | at 65.6° C. (b) | |
| Kelco | 1456.0 | 1420.0 | 1.03 |
| Sanofi | 1510.0 | 1502.0 | 1.01 |
| Rhone-Poulenc | 1436.0 | 1430.0 | 1.00 |
| Jungbunzlauer | 1510.0 | 1400.0 | 1.08 |
| Legal Limits | | | 1.02–1.45 |

Table 4 shows the effect of including locust bean gum in the xanthan/guar mixture, i.e., an increase in gel rigidity and melting point.

TABLE 4

Xanthan/locust bean/gum guar gels (native) (0.5% total) set at 10° C.

| Gel Composition Xan:LBG:Guar (%) | Break Load (g) | Elastic Limit (mm) | Gel Rigidity (g/mm) | Melting Point (°C.) |
| --- | --- | --- | --- | --- |
| 0.25:0.25:0 | 226.3 | 31.4 | 7.21 | 51.6 |
| 0.25:0.20:0.05 | 197.7 | 31.9 | 6.20 | 49.9 |
| 0.25:0.15:0.10 | 148.5 | 32.1 | 4.63 | 48.7 |
| 0.25:0.10:0.15 | 121.2 | 32.4 | 3.74 | 44.7 |
| 0.25:0.05:0.20 | 71.6 | 30.6 | 2.34 | 34.1 |
| 0.25:0.0:0.25 | 34.0 | 25.3 | 1.34 | 25.5 |

Xanthan - Keltrol from Kelco
LBG-Hercogum from PFW
Guar Gum - Sigma

Table 5 illustrates the dependence of gel properties on the source of guar (using Kelco xanthan).

TABLE 5

Guar/xanthan gels (native) (0.25/0.25%) set at 10° C.

| Gel | Break Load (g) | Elastic Limit (mm) | Gel Rigidity (g/mm) | Melting Point (°C.) |
| --- | --- | --- | --- | --- |
| Meyproguar (Meyhall)/ Xanthan | 38.8 | 27.5 | 1.41 | 25.2 |
| Guar (Sigma)/ Xanthan | 34.0 | 25.3 | 1.34 | 25.5 |

Galactomannan/xanthan systems

Stock solutions of xanthan (Keltrol), MeyproGuar (Meyhall) and MeyproGat 90, 60 and 30 (Meyhall) were prepared at 0.25, 0.5 and 1% (w/w) in distilled water by hydration, followed by heating to 90°–95° C. for 10–15 min. Hot solutions were combined to give the required final gel compositions in the ratios of 1:1 or for some combinations, i.e., MeyproGuar+MeyproGat 60 and 30+Xanthan, 1:1:2. The hot solutions were mixed thoroughly, cooled to room temperature and gelled at 10° C. for 18 hours.

The properties of the resulting gels are shown in Table 6.

TABLE 6

Galactomannan/xanthan gels (native) set at 10° C.

| Gel Composition | Break Load (g) | Elastic Limit (mm) | Gel Rigidity (g/mm) | Melting Point (°C.) |
| --- | --- | --- | --- | --- |
| MeyproGuar/Xan (0.25/0.25%) | 38.8 | 27.5 | 1.41 | 25.2 (27)* |
| MeyproGat90/Xan (0.25/0.25% | 21.1 | 24.5 | 0.86 | 25.4 (26)* |
| MeyproGat60/Xan (0.25/0.25%) | 8.7 | 18.7 | 0.47 | 24.4 (25)* |
| MeyproGat30/Xan (0.25/0.25%) | 6.9 | 15.7 | 0.44 | 23.1 (25)* |
| MeyproGat60/Xan (0.5/0.5%) | 10.0 | 15.38 | 0.65 | 29.4 (27)* |
| MeyproGat30/Xan (0.5/0.5%) | 7.1 | 14.75 | 0.48 | 28.3 (28)* |
| MeyproGuar/0.125 + MeyproGat60/0.125 + Xanthan/0.25 | 21.7 | 23.8 | 0.91 | 24.5 (26)* |

TABLE 6-continued

Galactomannan/xanthan gels (native) set at 10° C.

| Gel Composition | Break Load (g) | Elastic Limit (mm) | Gel Rigidity (g/mm) | Melting Point (°C.) |
| --- | --- | --- | --- | --- |
| MeyproGuar/0.125 + MeyproGat30/0.125 + Xanthan/0.25 | 17.5 | 23.1 | 0.76 | 24.4 (26)* |

*From CarriMed

What is claimed is:

1. A gelled comestible product having a gel melting point of from 0° C. to 45° C. comprising a gelling agent composition consisting essentially of xanthan and depolymerized guar.

2. The gelled comestible product as claimed in claim 1, wherein the gelling agent composition comprises from 30% to 70% by weight xanthan.

3. The gelled comestible product as claimed in claim 1, wherein the gelling agent composition further comprises locust bean gum.

4. The gelled comestible product as claimed in claim 3, wherein said gelling agent composition comprises xanthan, up to 20% by weight locust bean gum and from 20% to 80% by weight depolymerized guar gum.

5. The gelled comestible product as claimed in claim 1, wherein said gelling agent composition comprises from 20% to 80% by weight depolymerized guar.

6. The gelled comestible product as claimed in claim 1, wherein the gelling agent composition is present in an amount of from 0.3% to 1.5% by weight.

7. A gelled comestible product having a gel melting point of from 0° C. to 45° C. comprising a gelling agent composition consisting essentially of xanthan and guar.

8. The gelled comestible product as claimed in claim 7, wherein said gelling agent composition comprises from 30% to 70% by weight xanthan.

9. The gelled comestible product as claimed in claim 7, wherein said gelling agent composition further comprises locust bean gum.

10. The gelled comestible product as claimed in claim 9, wherein said gelling agent composition further comprises from 20% to 80% by weight xanthan, up to 20% by weight locust bean gum and from 20% to 80% by weight guar gum.

11. The gelled comestible product as claimed in claim 7, wherein said gelling agent composition comprises from 20% to 80% by weight guar.

12. The gelled comestible product as claimed in claim 7, wherein said gelling agent composition further comprises depolymerized guar.

13. The gelled comestible product as claimed in claim 7, wherein said gelling agent composition is present in an amount of from 0.3% to 1.5% by weight.

14. A method of making a gelled comestible product having a gel melting point of from 0° to 45° C. comprising disolving or dispersing a gelling composition consisting essentially of xanthan and guar in an aqueous fluid at an elevated temperature above the gel melting point, and then lowering the temperature of the resulting solution or dispersion to bring about the gelling thereof.

15. A method of making a gelled comestible product having a gel melting point of from 0° to 45° C. comprising disolving or dispersing a gelling composition consisting essentially of xanthan and depolymerized guar in an aqueous fluid at an elevated temperature above the gel melting point, and then lowering the temperature of the resulting solution or dispersion to bring about the gelling thereof.

* * * * *